United States Patent
Kokeguchi

(10) Patent No.: US 7,697,189 B2
(45) Date of Patent: Apr. 13, 2010

(54) DISPLAY ELEMENT

(75) Inventor: Noriyuki Kokeguchi, Kokubunji (JP)

(73) Assignee: Konica Minolta Holdings, Inc. (JP)

( * ) Notice: Subject to any disclaimer, the term of this patent is extended or adjusted under 35 U.S.C. 154(b) by 120 days.

(21) Appl. No.: 11/792,361

(22) PCT Filed: Nov. 21, 2005

(86) PCT No.: PCT/JP2005/021346

§ 371 (c)(1), (2), (4) Date: Jun. 5, 2007

(87) PCT Pub. No.: WO2006/061987

PCT Pub. Date: Jun. 15, 2006

(65) Prior Publication Data

US 2008/0075893 A1 Mar. 27, 2008

(30) Foreign Application Priority Data

Dec. 10, 2004 (JP) .............................. 2004-357828

(51) Int. Cl.
*G02F 1/153* (2006.01)
(52) U.S. Cl. ...................................................... 359/270
(58) Field of Classification Search ................. 359/265, 359/270
See application file for complete search history.

(56) References Cited

U.S. PATENT DOCUMENTS

| 4,240,716 A | 12/1980 | Camlibel et al. |
| 6,552,843 B1 * | 4/2003 | Tench et al. .................. 359/321 |
| 2004/0223207 A1 * | 11/2004 | Warner et al. ................ 359/265 |

FOREIGN PATENT DOCUMENTS

| JP | 3428603 | 10/1996 |
| JP | 2003-241227 | 8/2003 |
| JP | 2004-4267 | 1/2004 |
| JP | 2004-309798 | 11/2004 |

OTHER PUBLICATIONS

European Search Report for European Patent Application No. 05809159.6 mailed Oct. 8, 2008.

* cited by examiner

*Primary Examiner*—Joseph Martinez
(74) *Attorney, Agent, or Firm*—Cantor Colburn LLP

(57) ABSTRACT

There is provided a display element which is constituted of simple members, can achieve low-voltage drive and exhibits high display contrast and superior response speed. The display element comprises opposed electrodes having therebetween an electrolyte layer containing silver or a silver-containing compound, wherein the opposed electrodes are driven so that silver is dissolved and deposited and the electrolyte layer further contains at least one compound selected from the group consisting of compounds represented by formula (1), (2) or (3).

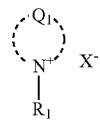

formula (1)

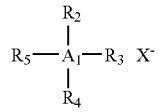

formula (2)

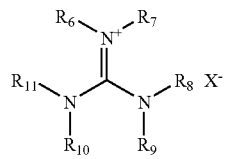

formula (3)

7 Claims, 1 Drawing Sheet

DISPLAY ELEMENT

CROSS REFERENCE TO RELATED APPLICATIONS

This is a U.S. national stage of application No. PCT/JP2005/021346, filed on 21 Nov. 2005. Priority under 35 U.S.C. §119(a) and 35 U.S.C. §365(b) is claimed from Japanese Application No. 2004-357828, filed 10 Dec. 2004, the disclosure of which is also incorporated herein by reference.

TECHNICAL FIELD

The present invention relates to electrochemical display elements employing solution deposition of silver.

TECHNICAL BACKGROUND

Recently, along with enhancement of the operating speed of personal computers, the spread of network infrastructures, and increased and lower-priced mass storage, information of documents or image, which were conventionally printed on paper, can be received simply as electronic informations so that opportunities to read such electronic information have increased dramatically.

There were used, as a means for reading electronic information, conventional liquid crystal displays or CRT and recent emission type displays, such as organic electroluminescence displays. Specifically, when electronic information is document information, it is necessary to notice this reading means over a relatively long period of time. It is hard to say that such an action is a kindly means to humans. There are generally known disadvantages of emission type displays such that flickering exhausts human eyes, they are awkward to carry about, the reading posture is restricted, it is necessitated to gaze at a stationary picture plane, and electric power consumption increases when reading over a long time.

As a display means to redeem the foregoing disadvantages is known a (nonvolatile) reflection display which employs external light and does not consume power for image retention. However, based on the reasons below, it is hard to say that such a display provides sufficient performance.

For instance, a system using a polarizing plate such as a reflection type liquid crystal display exhibits a relatively low reflectance up to 40%, resulting in difficulty in displaying whiteness and methods of preparing constituent members are not necessarily simple. A polymer dispersion liquid crystal display requires a relatively high voltage and employment of the difference in refractive index between organic compounds does not result in images with sufficient contrast. A polymer network type liquid crystal display has problems such that it requires a relatively high voltage and a complex TFT circuit to enhance memory. An electrophoretic display element needs a high voltage of more than 10 V, and there is concern of durability of the electrophoretic particles, due to their tendency to coagulate. An electroluminescence display element, which can be driven at a relatively low voltage of not more than 3 V, has problems that it is insufficient in color quality of black or colors (such as yellow, magenta, cyan, blue, green and red) and its display cells require complex layer arrangement such as a deposit layer to maintain memory.

There is known, as a display system to overcome these disadvantages of the foregoing systems, an electro-deposition (hereinafter, also denoted simply as ED) system which employs solution deposition of metals or metal salts. The ED system, which can be driven at a relatively low voltage of not more than 3 V, exhibits advantages such as simple cell constitution and being superior in black and white contrast and in black color quality. There were disclosed various methods (as described in, for example, Patent Documents 1-3).

As a result of detailed studies of the techniques disclosed in the foregoing patent documents, it was found by the inventors of this application that problems to be solved in prior art arose with the response speed due to the retarded rate of black silver formation. In addition thereto, there was neither description nor suggestion with respect to problem to be solved in this application and the constitution defined in the application.

Patent Document 1: U.S. Pat. No. 4,240,716
Patent Document 2: Japanese Patent No. 3428603
Patent Document 3: JP-A No. 2003-241227 (hereinafter, the term JP-A refers to Japanese Patent Application Publication)

DISCLOSURE OF THE INVENTION

Problem to be Solved by the Invention

The present invention has come into being in view of the foregoing problems and it is an object of the invention to provide a display element which is constituted of simple components, is drivable at a relatively low voltage and exhibits high display contrast and superior response speed.

Means for Solving the Problems

The object of the invention was realized by the following constitution:

1. A display element comprising opposed electrodes having therebetween an electrolyte layer containing silver or a compound including silver in its chemical structure, wherein the opposed electrodes are driven so that dissolution and deposition of silver is caused and the electrolyte layer further contains at least one selected from the group consisting of compounds represented by formula (1), (2) or (3):

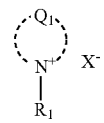

formula (1)

wherein $Q_1$ is an atomic group necessary to form a 5- or 6-membered cationic aromatic ring with a nitrogen atom, $R_1$ is a substituted or unsubstituted alkyl group or a substituted or unsubstituted alkenyl group, and $X^-$ is an anion;

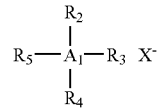

formula (2)

wherein $A_1$ is a nitrogen atom or a phosphorus atom, $R_2$ to $R_5$ are each independently a substituted or unsubstituted alkyl group or a substituted or unsubstituted alkenyl group, and $X^-$ is an anion;

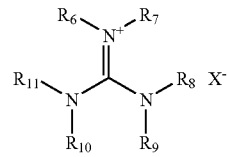

formula (3)

wherein $R_6$ to $R_{11}$ are each independently a substituted or unsubstituted alkyl group or a substituted or unsubstituted alkenyl group, and $X^-$ is an anion;

2. The display element as described in 1, wherein the electrolyte layer contains a pyridinium compound represented by formula (1) in an amount of 1 to 20% by mass, based on an electrolyte solvent contained in the electrolyte layer.

3. A display element comprising opposed electrodes having therebetween an electrolyte layer containing silver or a compound including silver in its chemical structure, wherein the opposed electrodes are driven so that solution and deposition of silver is caused and the electrolyte layer further contains a silver salt melt prepared by dissolving in a solvent a silver salt of a cation of a compound represented by the foregoing formula (1), (2) or (3).

4. The display element as described in any one of 1 to 3, wherein the element satisfies the following requirement as defined in equation (1):

$$0 \leq [X]/[Ag] \leq 0.01 \qquad \text{equation (1)}$$

wherein [α] is a molar concentration (mole/kg) of halogen ions or halogen atoms contained in the electrolyte layer and [Ag] is a total molar concentration of silver contained in the electrolyte layer or silver included in the compound including silver in its chemical structure.

5. The display element as described in any one of 1 to 4, wherein the electrodes are driven by applying thereto a voltage more than a deposition overpotential to deposit black silver, followed by application of a voltage not more than the deposition voltage to continue deposition of black silver.

EFFECT OF THE INVENTION

According to the invention there is provided a display element which is constituted of simple members, is drivable at a relatively low voltage and exhibits high display contrast and superior response speed.

EXPLANATION OF NUMERAL

Figure 1:
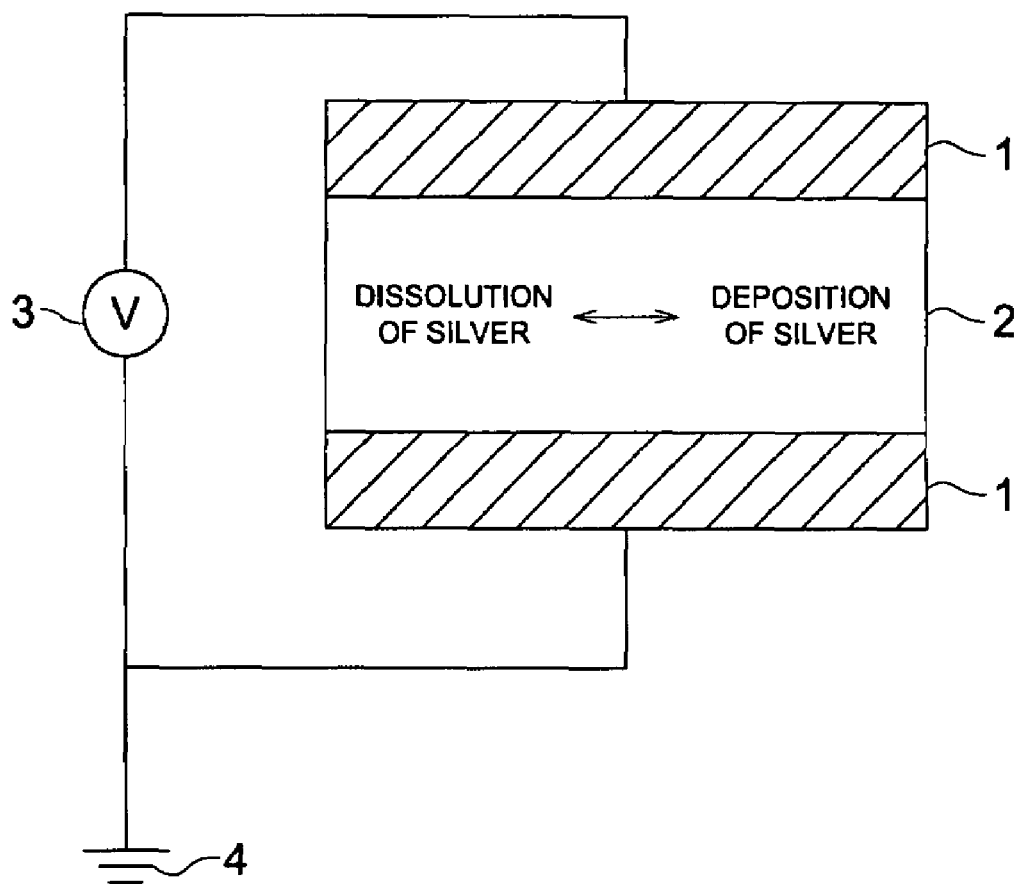
FIG. 1 illustrates a sectional view showing the basic constitution of a display element of the invention.

1: Opposed electrodes
2: Electrolyte layer
3: Power source
4: Earth

PREFERRED EMBODIMENTS OF THE INVENTION

There will be detailed preferred embodiments of the invention.

As a result of extensive study in light of the problems described above, the inventors of this application discovered that a display element comprises opposed electrodes having between them an electrolyte layer containing silver or a compound including silver in its chemical structure, wherein the opposed electrodes are so driven that dissolution and deposition of silver is caused and the electrolyte layer contains at least one compound selected from compounds represented by formulas (1), (2) and (3), whereby a display element which is constituted of simple components, is drivable at a relatively low voltage and exhibits high display contrast and superior response speed is provided.

In the following, the invention will be described in detail.

The display element of the invention features the electrolyte layer containing, as a melt electrolyte, at least one selected from the group of compounds represented by the foregoing formula (1), (2) or (3).

In the foregoing formula (1), $Q_1$ represents an atomic group necessary to form a 5- or 6-membered ring with a nitrogen atom. $Q_1$ is preferably formed of atoms selected from the group consisting of a carbon atom, a hydrogen atom, a nitrogen atom, an oxygen atom and a sulfur atom. A 5-membered ring formed of $Q_1$ is preferably an oxazole ring, a thiazole ring, an imidazole ring, a pyrazole ring, an isooxazole ring, a thiadiazole ring, an oxadiazole ring, a triazole ring, an indole ring or a pyrrole ring, and more preferably an oxazole ring or an imidazole ring. A 6-membered ring formed of $Q_1$ is preferably a pyridine ring, a pyrimidine ring, a pyridazine ring, a pyrazine ring or a triazine ring, and more preferably a pyridine ring.

In the formula (2), A is a nitrogen atom or a phosphorus atom.

In the formulas (1), (2) and (3), $R_1$ through $R_{11}$ are each independently a substituted or unsubstituted alkyl group (preferably having 1 to 24 carbon atoms, which may be straight-chained or branched, or cyclic, e.g., methyl, ethyl, propyl, isopropyl, pentyl, hexyl, octyl, 2-ethylhexyl, t-octyl, decyl, dodecyl, tetradecyl, 2-hexyldecyl, octadecyl, cyclohexyl, cyclopentyl) or a substituted or unsubstituted alkenyl group (preferably having 2 to 24 carbon atoms, which may be straight-chained or branched, e.g., vinyl, allyl). $R_1$ through $R_1$, preferably are each independently an alkyl group having 2 to 18 carbon atom or an alkenyl group having 2 to 18 carbon atoms, and more preferably an alkyl group having 2 to 6 carbon atoms.

In the formula (2), at least two of $R_2$ to $R_6$ may combine with each other to form a ring.

The foregoing $Q_1$ and $R_1$ to $R_{11}$ each may be substituted. Preferred examples of a substituent include a halogen atom (e.g., F, Cl, Br, I), a cyano group, an alkoxy group (e.g., methoxy, ethoxy, methoxyethoxy, methoxyethoxyethoxy), an aryloxy group (e.g., phenoxy), an alkylthio group (e.g., methylthio, ethylthio), an alkoxycarbonyl group (e.g., ethoxycarbonyl), a carbonic acid ester group (e.g., ethoxycarbonyloxy), an acyl group (e.g., acetyl, propionyl, benzoyl), a sulfonyl group (e.g., methanesulfonyl, benzenesulfonyl), an acyloxy group (e.g., acetoxy, benzoyloxy), a phosphonyl group (e.g., diethylphosphonyl), am amido group (e.g., acetylamino, benzoylamino), a carbamoyl group (e.g., N,N-dimethylcarbamoyl), an alkyl group (e.g., methyl, ethyl, propyl, isopropyl, cyclopropyl, butyl, 2-carboxyethyl, benzyl), an aryl group (e.g., phenyl, tolyl), a heterocyclic group (e.g., pyridyl, imidazolyl, furanyl), an alkenyl group (e.g., vinyl, 1-propenyl), a silyl group and a silyloxy group.

The compound represented by the formula (1), (2) or (3) may form a polymer via either one of $Q_1$ and $R_1$ to $R_{11}$.

In the formulas (1), (2) and (3), $X^-$ is an anion. Preferred examples of $X^-$ include a halogen ion (e.g., $I^-$, $Cl^-$, $Br^-$), $SCN^-$, $BF_4^-$, $PF_6^-$, $ClO_4^-$, $(CF_3SO_2)N^-$, $(CF_3CF_2SO_2)N^-$, $CH_3SO_3^-$, $CF_3SO_3^-$, $CF_3COO^-$, $Ph_4B^-$, AND $(CF_3SO_2)C^-$. $X^-$ is preferably $I^-$, $SCN^-$, $CF_3SO_3^-$, $CF_3COO^-$, $(CF_3SO_2)_2N^-$ or $BF_4^-$.

Specific examples of compounds represented by formulas (1) to (3) are shown below but the invention is not limited to these exemplified compounds.

Compounds represented by formulas (1) to (3) are commercially available, such as 1-butyl-2,3-dimethylimidazolium trifluoromethanesulfonate, available from Kanto Kagaku Co., Ltd. Syntheses thereof can be done with reference to, for example, "Ion-sei Ekitai no Kinou Sousei to Ohyou" 2004, February, 2004, NTS company Ltd.

Compounds of formulas (1) to (3) are preferably contained in the electric layer in a total amount of not less than 1% by mass and not more than 99% by mass.

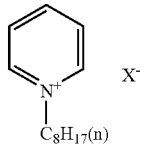

1-1: X⁻ = I⁻
1-2: X⁻ = BF₄⁻
1-3: X⁻ = N⁻(SO₂CF₃)₂
1-4: X⁻ = PF₆⁻

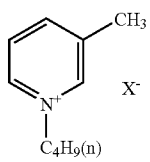

2-1: X⁻ = I⁻
2-2: X⁻ = BF₄⁻
2-3: X⁻ = N⁻(SO₂CF₃)₂
2-4: X⁻ = CF₃COO⁻
2-5: X⁻ = SCN⁻
2-6: X⁻ = CF₃SO₃⁻

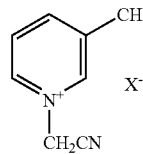

3-1: X⁻ = I⁻
3-2: X⁻ = BF₄⁻
3-3: X⁻ = N⁻(SO₂CF₃)₂

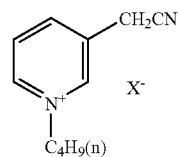

4-1: X⁻ = I⁻
4-2: X⁻ = BF₄⁻
4-3: X⁻ = N⁻(SO₂CF₃)₂

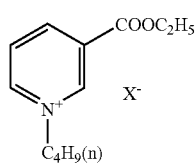

5-1: X⁻ = I⁻
5-2: X⁻ = BF₄⁻
5-3: X⁻ = N⁻(SO₂CF₃)₂

-continued

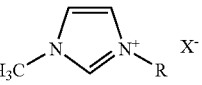

6-1: X⁻ = I⁻, R = Et
6-2: X⁻ = BF₄⁻, R = Et
6-3: X⁻ = N⁻(SO₂CF₃)₂, R = Et
6-4: X⁻ = Br⁻, R = Et
6-5: X⁻ = CF₃COO⁻, R = Et
6-6: X⁻ = SCN⁻, R = Et
6-7: X⁻ = CF₃SO₃⁻, R = Et
6-8: X⁻ = I⁻, R = Pr
6-9: X⁻ = BF₄⁻, R = Pr
6-10: X⁻ = N⁻(SO₂CF₃)₂, R = Pr
6-11: X⁻ = I⁻, R = Bu
6-12: X⁻ = BF₄⁻, R = Bu
6-13: X⁻ = N⁻(SO₂CF₃)₂, R = Bu

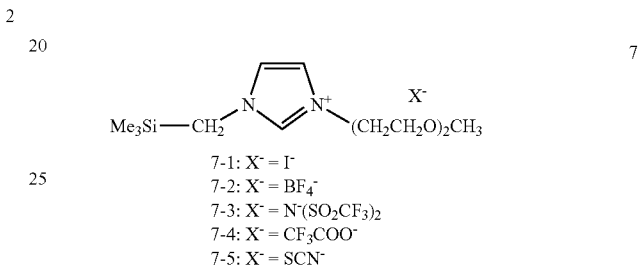

7-1: X⁻ = I⁻
7-2: X⁻ = BF₄⁻
7-3: X⁻ = N⁻(SO₂CF₃)₂
7-4: X⁻ = CF₃COO⁻
7-5: X⁻ = SCN⁻

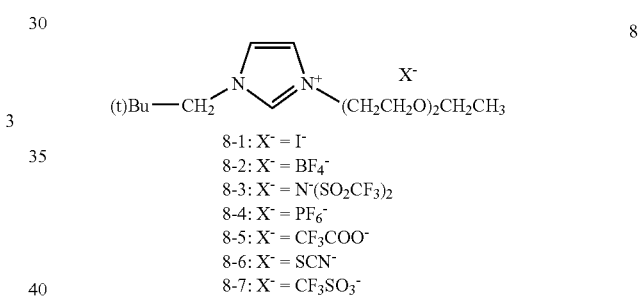

8-1: X⁻ = I⁻
8-2: X⁻ = BF₄⁻
8-3: X⁻ = N⁻(SO₂CF₃)₂
8-4: X⁻ = PF₆⁻
8-5: X⁻ = CF₃COO⁻
8-6: X⁻ = SCN⁻
8-7: X⁻ = CF₃SO₃⁻

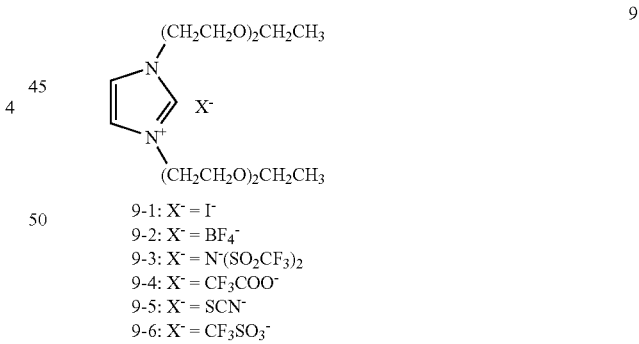

9-1: X⁻ = I⁻
9-2: X⁻ = BF₄⁻
9-3: X⁻ = N⁻(SO₂CF₃)₂
9-4: X⁻ = CF₃COO⁻
9-5: X⁻ = SCN⁻
9-6: X⁻ = CF₃SO₃⁻

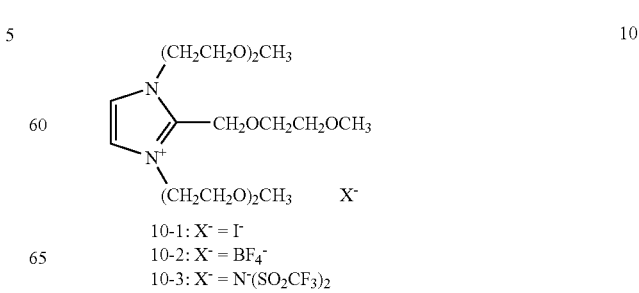

10-1: X⁻ = I⁻
10-2: X⁻ = BF₄⁻
10-3: X⁻ = N⁻(SO₂CF₃)₂

-continued

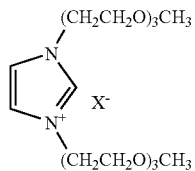

11-1: X⁻ = I⁻
11-2: X⁻ = BF₄⁻
11-3: X⁻ = N⁻(SO₂CF₃)₂

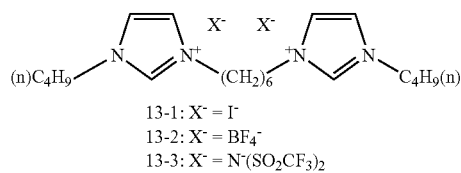

13-1: X⁻ = I⁻
13-2: X⁻ = BF₄⁻
13-3: X⁻ = N⁻(SO₂CF₃)₂

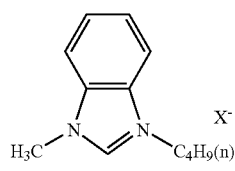

13-1: X⁻ = I⁻
13-2: X⁻ = BF₄⁻
13-3: X⁻ = N⁻(SO₂CF₃)₂

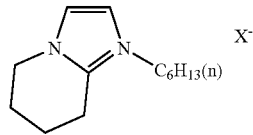

14-1: X⁻ = I⁻
14-2: X⁻ = BF₄⁻
14-3: X⁻ = N⁻(SO₂CF₃)₂

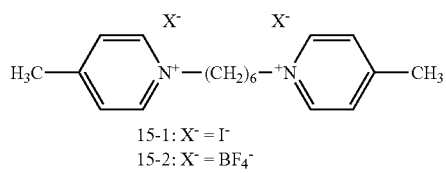

15-1: X⁻ = I⁻
15-2: X⁻ = BF₄⁻
15-3: X⁻ = N⁻(SO₂CF₃)₂

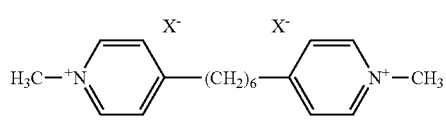

16-1: X⁻ = I⁻
16-2: X⁻ = BF₄⁻
16-3: X⁻ = N⁻(SO₂CF₃)₂

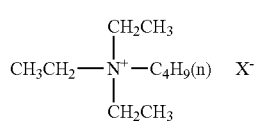

17-1: X⁻ = I⁻
17-2: X⁻ = BF₄⁻
17-3: X⁻ = N⁻(SO₂CF₃)₂
17-4: X⁻ = PF₆⁻

-continued

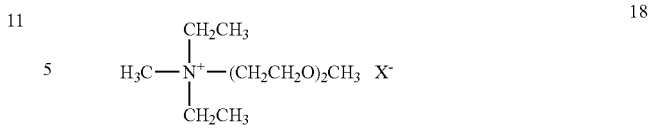

18-1: X⁻ = I⁻
18-2: X⁻ = BF₄⁻
18-3: X⁻ = N⁻(SO₂CF₃)₂

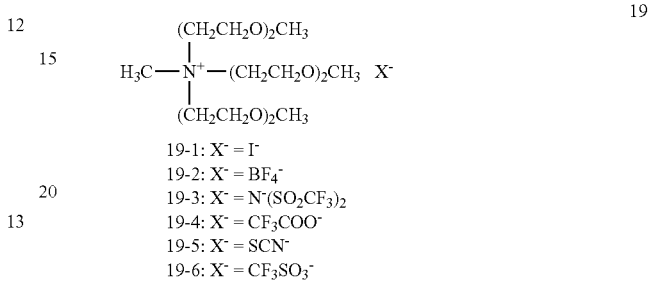

19-1: X⁻ = I⁻
19-2: X⁻ = BF₄⁻
19-3: X⁻ = N⁻(SO₂CF₃)₂
19-4: X⁻ = CF₃COO⁻
19-5: X⁻ = SCN⁻
19-6: X⁻ = CF₃SO₃⁻

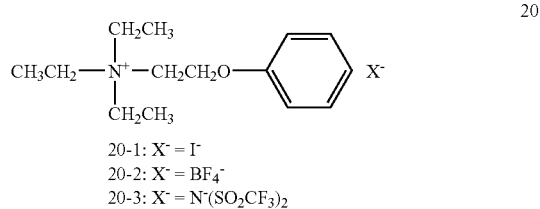

20-1: X⁻ = I⁻
20-2: X⁻ = BF₄⁻
20-3: X⁻ = N⁻(SO₂CF₃)₂

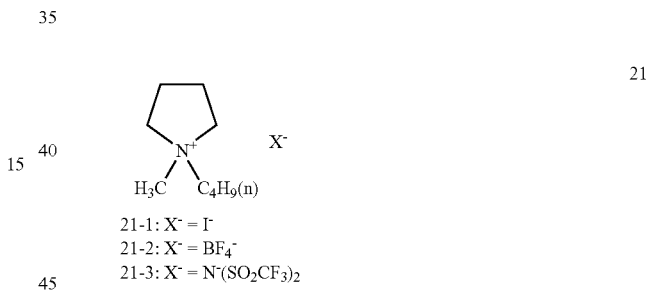

21-1: X⁻ = I⁻
21-2: X⁻ = BF₄⁻
21-3: X⁻ = N⁻(SO₂CF₃)₂

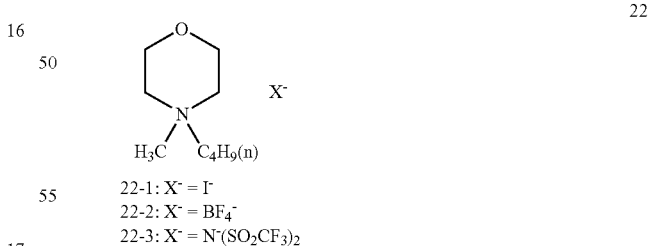

22-1: X⁻ = I⁻
22-2: X⁻ = BF₄⁻
22-3: X⁻ = N⁻(SO₂CF₃)₂

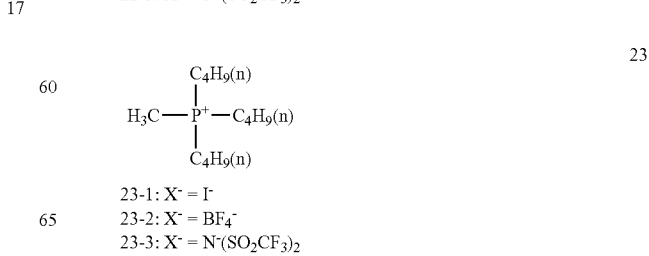

23-1: X⁻ = I⁻
23-2: X⁻ = BF₄⁻
23-3: X⁻ = N⁻(SO₂CF₃)₂

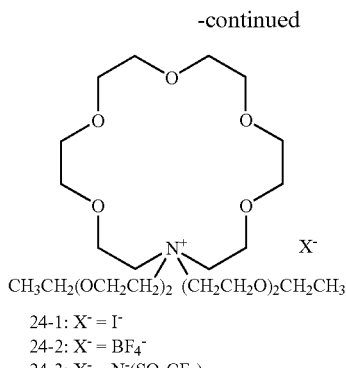

24-1: X⁻ = I⁻
24-2: X⁻ = BF₄⁻
24-3: X⁻ = N⁻(SO₂CF₃)₂

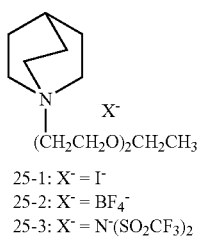

25-1: X⁻ = I⁻
25-2: X⁻ = BF₄⁻
25-3: X⁻ = N⁻(SO₂CF₃)₂

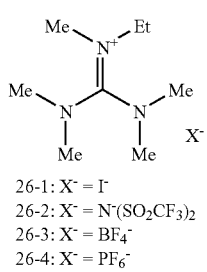

26-1: X⁻ = I⁻
26-2: X⁻ = N⁻(SO₂CF₃)₂
26-3: X⁻ = BF₄⁻
26-4: X⁻ = PF₆⁻

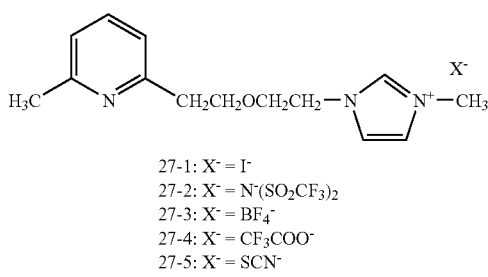

27-1: X⁻ = I⁻
27-2: X⁻ = N⁻(SO₂CF₃)₂
27-3: X⁻ = BF₄⁻
27-4: X⁻ = CF₃COO⁻
27-5: X⁻ = SCN⁻
27-6: X⁻ = CF₃SO₃⁻

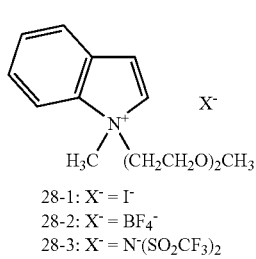

28-1: X⁻ = I⁻
28-2: X⁻ = BF₄⁻
28-3: X⁻ = N⁻(SO₂CF₃)₂

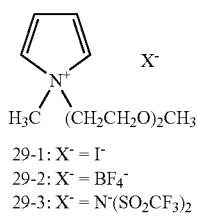

29-1: X⁻ = I⁻
29-2: X⁻ = BF₄⁻
29-3: X⁻ = N⁻(SO₂CF₃)₂

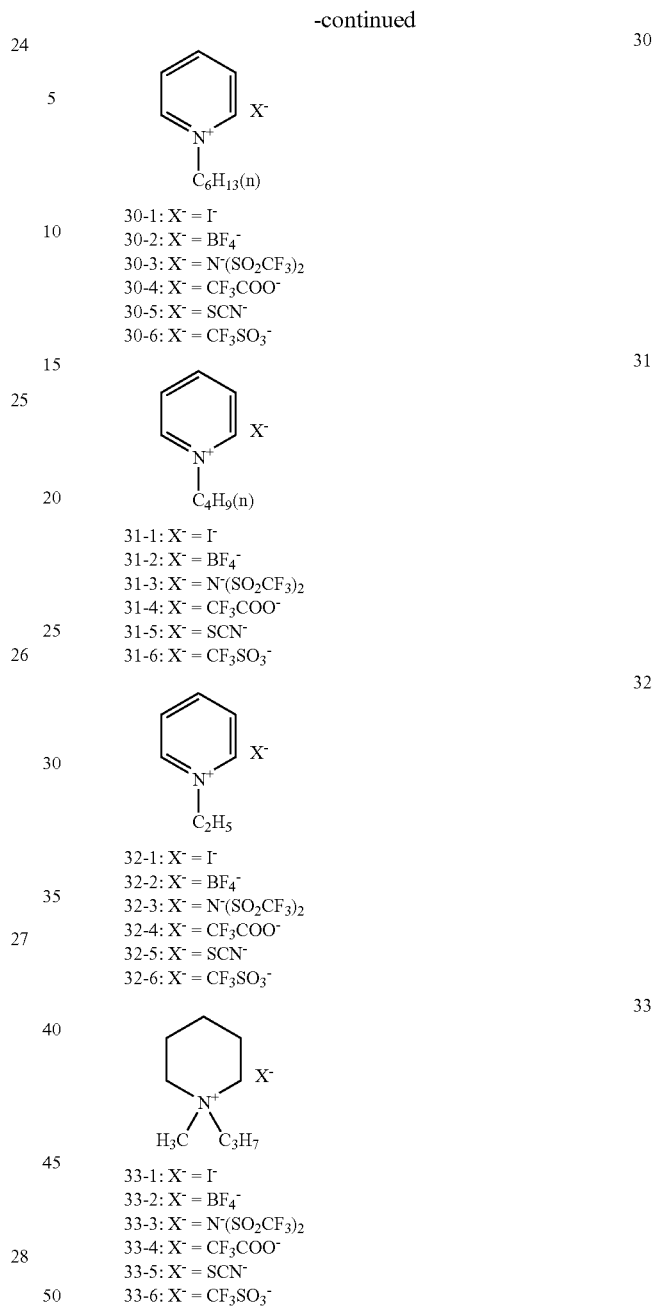

30-1: X⁻ = I⁻
30-2: X⁻ = BF₄⁻
30-3: X⁻ = N⁻(SO₂CF₃)₂
30-4: X⁻ = CF₃COO⁻
30-5: X⁻ = SCN⁻
30-6: X⁻ = CF₃SO₃⁻

31-1: X⁻ = I⁻
31-2: X⁻ = BF₄⁻
31-3: X⁻ = N⁻(SO₂CF₃)₂
31-4: X⁻ = CF₃COO⁻
31-5: X⁻ = SCN⁻
31-6: X⁻ = CF₃SO₃⁻

32-1: X⁻ = I⁻
32-2: X⁻ = BF₄⁻
32-3: X⁻ = N⁻(SO₂CF₃)₂
32-4: X⁻ = CF₃COO⁻
32-5: X⁻ = SCN⁻
32-6: X⁻ = CF₃SO₃⁻

33-1: X⁻ = I⁻
33-2: X⁻ = BF₄⁻
33-3: X⁻ = N⁻(SO₂CF₃)₂
33-4: X⁻ = CF₃COO⁻
33-5: X⁻ = SCN⁻
33-6: X⁻ = CF₃SO₃⁻

Of these compounds shown above, compounds 6-3, 18-3, 21-3, 30-3, 31-3 and 33-3 are preferred.

Further, other examples include compounds described in WO 95/18456, JP-A No. 8-259245, and Electrochemistry 65 [11] 923 (1997).

Compounds of formulas (1) to (3), relating to the invention may be used singly or in combination.

In the display element of the invention, the electrolyte layer preferably contains a pyridinium compound among compounds of formula (1), in an amount of 1 to 20% by mass, based on the electrolyte solvent. When a compound of formula (1) is contained in the electrolyte layer at an amount of 1 to 20% by mass, sufficiently enhanced response speed is achieved, yellowish brown coloring due to the compound of formula (1) is and staining in white display is also prevented.

In one preferred embodiment of the display element of the invention, the electrolyte layer contains a silver salt melt which is prepared by dissolving, in a solvent, a cationic compound silver salt of a compound represented by the foregoing formula (1), (2) or (3).

When a silver salt is dissolved in a solvent, there is usually used, as a silver salt source, silver iodide, silver chloride, silver bromide, silver citrate, silver oxalate or silver behenate. To maximize a concentration of dissolved silver, it is advantageous to dissolve in an electrolyte a silver salt of a compound capable of coordinating with silver, such as nitrogen-containing compound, which was previously prepared. When a high temperature treatment at about 120° C. is required in the preparation process, blocking silver in advance reduces discoloration due to blackening, facilitating process operations and leading to enhanced stability of the electrolyte solution.

Further, addition of a silver salt (namely, molten silver salt) is advantageous in terms of elimination of a counter salt, compared to separate addition of a silver salt compound and a compound of formula (1), (2) or (3). It is also preferred to separately add a silver salt and a similar cation species to prepare the electrolyte solution. Separate addition of a cation species results in reduction of so-called solvent shock during addition of a silver salt, enabling shortening of the solution-standing time necessary to render the compound species homogeneous.

The display element of the invention preferably satisfies the requirement of $0 \leq [X]/[Ag] \leq 0.01$, wherein [X] is a molar concentration (mole/kg) of halogen ions or halogen atoms contained in the electrolyte layer and [Ag] is a molar concentration (mole/kg) of silver or a compound containing a silver in the molecule, contained in the electrolyte layer.

The halogen atoms relating to the invention refer to iodine atoms, chlorine atoms, bromine atoms or fluorine atoms. A ratio [X]/[Ag] of more than 0.01 produces $X^- \rightarrow X_2$ in an oxidation-reduction reaction of silver and the produced $X_2$ readily cross-oxidizes black silver to allow dissolution of the black silver, becoming one of factors resulting in reduced memory capacity. The molar concentration ratio of halogen atom to silver is preferably as low as possible. In the invention it is more preferably $0 \leq [X]/[Ag] \leq 0.001$. When adding halogen ions, the sum of halogen species molar concentration is preferably in the order of [I]<[Br]<[Cl]<[F], in terms of enhanced memory.

Electrolyte Solvent

In the display element of the invention, the electrolyte layer preferably contains at least one solvent selected from the group consisting of propylene carbonate, ethylene carbonate, ethylmethyl carbonate, diethyl carbonate, dimethyl carbonate, butylene carbonate, γ-butyrolactone, tetramethylurea, sulfolane, dimethyl sulfoxide, 1,3-dimethyl-2-imidazolidinone, 2-(N-methyl)-2-pyrrolidinone, hexamethylphosphortriamide, N-methylpropioneamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water.

Of solvents described above, it is preferred to contain at least one solvent exhibiting a freezing point of not more than −20° C. and a boiling point of not less than 120° C.

Other solvents usable in the invention include those shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electrolytes Handbook", Vol. 1, Academic Press (1972).

Electrolyte/Silver Salt

In the display element of the invention are usable commonly known silver salt compounds, such as silver iodide, silver chloride, silver bromide, silver oxide, silver sulfide, silver citrate, silver acetate, silver behenate, silver p-toluenesulfonate, silver salts of mercapto-compounds and silver complexes with iminodiacetic acids. Of these silver salts, silver salts of a halogen, a carboxylic acid or a compound not containing a nitrogen atom capable of coordinating with silver are preferred, such as silver p-toluenesulfonate.

The concentration of silver ions contained in the electrolyte layer relating to the invention is preferably $0.2 \text{ mol/kg} \leq [Ag] 2.0 \text{ mol/kg}$.

A silver ion concentration of less than 0.2 mol/kg becomes a dilute silver solution, retarding the driving speed. A silver ion concentration of more than 2.0 mol/kg deteriorates solubility and disadvantageously tends to cause precipitation during storage at a low temperature.

Electrolyte Material

In the display element of the invention, a liquid electrolyte can contain therein compounds as below. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonium borofluoride, tetrabutylammonium borofluoride, and tetrabutylammonium halide. In addition, there are preferably used fused salt electrolyte compositions described in paragraphs [0062]-[0081] of JP-A No. 2003-187881. Further, there are also usable compounds which form oxidation-reduction pairs such as $I^-/I_3^-$, $Br^-/Br_3^-$ and quinone/hydroquinone.

Further, a solid electrolyte can contain therein compounds exhibiting electronic or ionic conductivity, as described below.

Examples of such compounds include fluorinated vinyl based polymers containing perfluorosulfonic acid, polythiophene, polyaniline, polypyrrole, triphenylamines, polyvinylcarbazoles, polymethylphenylsilanes, calcogenides such as $Cu_2S$, $Ag_2S$, $Cu_2Se$, and $AgCrSe_2$, fluorine compounds such as $CaF_2$, $PbF_2$, $SrF_2$, $LaF_3$, $TlSn_2F_5$, and $CeF_3$, lithium salts such as $Li_2SO_4$ and $Li_4SiO_4$ and compounds such as $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, and $Li_6NBr_3$.

There may be employed, as supporting electrolytes, electrolytes in gel form. When electrolytes are nonaqueous, there may be used oil gelling agents described in paragraphs [0057]-[0059] of JP-A No. 11-185836.

White Particles to be Added to the Electrolyte Layer

In the display element of the invention, the electrolyte layer preferably contains white particles.

Examples of white particles include titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogenphosphate, alkaline earth metal salts, talc, kaolin, zeolite, acid clay, glass, as well as organic compounds such as polyethylene, polystyrene, acryl resins, ionomers, ethylene-vinyl acetate copolymer resins, benzoguanamine resins, urea-formalin resins, melamine-formalin resins and polyamide resins. These particles may be used singly or in combination. Also, the particles may contain voids to alter the refractive index.

Of these particles, there are preferably employed titanium dioxide, zinc oxide, and zinc hydroxide. More preferably are employed titanium dioxide which has been subjected to a surface treatment employing inorganic oxides (e.g., $Al_2O_3$, AlO(OH), $SiO_2$). In addition to such surface treatments, titanium dioxide particles may be subjected to a treatment employing organic compounds such as trimethylolethane or triethanolamine acetic acid salts.

Of these white particulate materials, titanium oxide or zinc oxide are preferably used in terms of prevention of coloring at a relatively high temperature or reflectance of the display element which is influenced by the refractive index.

Thickening Agents to be Added to the Electrolyte Layer

In the display element of the invention, there may be used thickening agents in the electrolyte layer. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickening agents may be used in combination. There are further cited the compounds described on pages 71-75 of JP-A No. 64-13546. Of these, polyvinyl alcohols, polyvinylpyrrolidones, hydroxypropyl celluloses, and polyalkylene glycols are preferably used in terms of compatibility with various types of additives and enhancement of dispersion stability of white particles.

Other Additives to the Electrolyte Layer

Auxiliary layers of the display element of the invention include a protective layer, a filter layer, an antihalation layer, a cross-over light cutting layer, and a backing layer. These auxiliary layers may contain chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbents, antirradiation dyes, filter light absorbing dyes, mildewcides, polymer latexes, heavy metals, antistatic agents, and matting agents.

The additives described above are detailed in Research Disclosure (hereinafter denoted simply as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds cited in RD are listed below.

| Additives | RD 17643 | | RD 18716 | | RD 30 | |
|---|---|---|---|---|---|---|
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

Layer Configuration

The layer configuration between opposed electrodes related to the display element of the invention will now be described in more detail.

As the layer configuration related to the display element of the invention, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CUSCN, $CuInSe_2$, $Cu(In,Ga)Se$, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$ Substrates There are preferably employed as substrates usable in the invention plastic films composed of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndioctatic structured polystyrenes. These are prepared employing the methods described, for example, in each of JP-A Nos. 62-117708, 1-46912, and 1-178505. Further, examples of supports include metal substrates including stainless steel, paper supports such as baryta paper or resin coated paper, supports including the above plastic film having thereon a reflection layer, and those which are described in JP-A No. 62-253195 (pages 29-31) as a support. There are also preferably used those described on page 28 of RD No. 17643, from the right column to the left column on page 648 of RD No. 18716, and on page 879 of RD No. 307105. As described in U.S. Pat. No. 4,142,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the invention, there may be employed as surface treatments a glow discharge treatment, an ultraviolet radiation irradiation treatment, a corona treatment and a flame treatment. Further there may be employed supports described on pages 44-149 of Kochi Gijutsu (Prior Art Technology) No. 5 (published by AZTEC Corp., dated Mar. 22, 1991). There are further cited "Supports" described on page 1009 of RD No. 308119 and on page 108 of Product Licensing Index Volume 92. In addition, there are also usable glass substrates and epoxy resins kneaded with glass powder.

Electrodes

In the display element of the invention, it is preferable that at least one of the opposed electrodes is a metal electrode. There may be employed, as a metal electrode, metals such as platinum, gold, silver, copper, aluminum, zinc, nickel, titanium, or bismuth and alloys thereof, which are known in the art. Preferred metals employed in the metal electrodes are those which exhibit a work function near the oxidation-reduction potential of silver in electrolytes. Of these, a silver electrode or an electrode having a silver content of at least 80 percent is advantageous to maintain a reduced state of silver, which also is superior in anti-staining of electrodes. Methods for preparing electrodes can employ conventional ones such as a evaporating method, a printing method, an ink-jet method, a spin coating method, and a CVD method.

Further, the display element of the invention preferably comprises a transparent electrode as at least one of the opposed electrodes. Transparent electrodes are not particularly limited so far as they are transparent and electrically conductive. Examples thereof include indium tin oxide (ITO), indium zinc oxide (IZO), tin oxide (FTO), indium oxide, zinc oxide, platinum, gold, silver rhodium, copper, chromium, carbon, aluminum, silicon, amorphous silicon, and BSO (bismuth silicon oxide). Such electrodes as described above can be formed, for example, in the manner that an ITO layer may be subjected to mask evaporation on a substrate employing a sputtering method, or after forming an ITO layer on the entire surface, patterning may be performed employing a photolithographic method. The surface resistance value is preferably 100 $\Omega$/sq or less, and is more preferably 10 $\Omega$/sq or less. The thickness of the transparent electrodes is not particularly limited but is commonly 0.1-20 $\mu$m.

Other Components Constituting the Display Element

The display element of the invention may optionally employs sealing agents, column-structured materials, and spacer particles.

Sealing agents are those to seal materials so that they do not leak out. There may be employed, as sealing agents, heat curing, light curing, moisture curing, and anaerobic curing resins such as epoxy resins, urethane resins, acryl resins, vinyl acetate resins, ene-thiol resins, silicone resins, or modified polymer resins.

Columnar structure materials provides strong self-supporting (strength) between substrates. Examples thereof include a cylindrical form, a quadrangular form, an elliptic cylindrical form, and a trapezoidal form, which are arranged at definite intervals in a specified pattern such as a lattice. Further, there may be employed stripe-shaped ones arranged at definite intervals. It is preferable that the columnar structure materials are not randomly arranged but arranged at an equal distance, arranged so that the interval gradually varies, or a predetermined pattern is repeated at a definite cycle so that the distance between substrates is appropriately maintained and image display is not hindered. When 1 to 40% of the display region of a display element is accounted for by the columnar structure materials, sufficient strength for commercial viability is achieved as a display element.

There may be provided a spacer between paired substrates to maintain a uniform gap between them. Examples of such a spacer include spherical materials composed of resins or inorganic oxides. Further, adhesion spacers are suitably employed the surface of which is coated with thermoplastic resins. In order to maintain the uniform gap between substrates, there may be provided only columnar structure materials. However, there may be provided both spacers and columnar structure materials. In place of the columnar structure materials, only spacers may be employed as a space-holding member. The diameter of spacers, when a columnar structure material is formed, is not more than its height, and is preferably equal to the height. When the column-structured material is not formed, the diameter of spacers corresponds to the distance of the cell gap.

Screen Printing

In the invention, sealing agents, columnar structure materials, and electrode patterns can be formed employing a screen printing method. In screen printing methods, a screen on which predetermined patterns are formed is covered on the electrode surface, and printing materials (compositions to form column-structured materials such as light-curing resins) are placed on the screen. Subsequently, a squeegee is moved at a predetermined pressure, angle and rate, whereby the printing materials are transferred onto the above substrate via the pattern of the screen. Then, the transferred materials are thermally cured and dried. When columnar structure materials are formed employing the screen printing method, resin materials are not limited to light-curable resins, but there may also employed, for example, heat curable resins such as epoxy resins or acryl resins and thermoplastic resins. Examples of thermoplastic resin include a polyvinyl chloride resin, a polyvinylidene chloride resin, a polyvinyl acetate resin, a polymethacrylic acid ester resin, a polyacrylic acid ester resin, a polystyrene resin, a polyamide resin, a polyethylene resin, a polypropylene resin, a fluorocarbon resin, a polyurethane resin, a polyacrylonitrile resin, a polyvinyl ether resin, a polyvinylketone resin, a polyether resin, a polyvinylpyrrolidone resin, a saturated polyester resin, a polycarbonate resin, and a chlorinated polyether resin. It is preferable that resin materials are employed in the form of a paste obtained through, for example, solution in suitable solvents.

As noted above, after forming the columnar structure materials on the substrate, spacers are provided on at least one side of the substrate, and paired substrates are placed so that the electrode forming surfaces are opposed to each other, whereby an empty cell is formed. By heating the paired opposing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then simultaneously sealed when the substrates are allowed to adhere to each other.

Driving Method of Display Element

In the display element of the invention, it is preferred to perform a driving operation such that black silver is allowed to be deposited by applying a voltage more than the deposition overpotential and deposition of black silver continues with applying a voltage not more than the deposition overpotential. Performing such a driving operation results in reduction of write energy, reduced load of the driving circuit and enhanced writing speed. Existence of overpotential in the electrode reaction is generally known in the field of electrochemistry. The overpotential is detailed in, for example, "Chemistry of Electron Transfer/Introduction of Electrochemistry" (1996, published by Asakura Shoten) on page 121. The display element of the invention is regarded as an electrode reaction of an electrode and silver within an electrolyte so that existence of an overpotential in dissolution and deposition of silver is readily understand. Since the magnitude of an overpotential controls an exchange current density, from the fact that after formation of black silver, deposition of black silver can be continued by voltage application of not more than a deposition overpotential, it is assumed that the surface of black silver can readily perform electron injection at lower excess energy.

The driving operation of the display element of the invention may be simple matrix drive or an active matrix drive. In the invention, the simple matrix drive refers to a driving method of successive application of current to a circuit in which a positive electrode line including plural positive electrodes and a negative electrode line including plural negative electrodes are opposed to each other and cross in the vertical direction. The use of a simple matrix drive enables simplification of the circuit structure and the driving IC, resulting in advantages such as lowered production cost. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function. Accordingly, there can be used the circuit described, for example, in FIG. 5 of JP-A No. 2004-29327.

Commercial Application

It is feasible to apply the display element of the invention to ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers and passports.

EXAMPLES

The present invention will be further described with reference to examples but the invention is by no means limited to these.

Example 1

Preparation of Display Element

Preparation of Display Element 1

Preparation of Electrolyte Solution:

To 2.5 g of dimethylsulfoxide were added 90 mg of sodium iodide and 75 mg of silver iodide, which were completely dissolved. Further thereto, 0.5 g of titanium oxide the surface of which was previously subjected to a hydrophobilization treatment with a silane coupling agent, was added and dispersed by using an ultrasonic homogenizer. To the thus obtained dispersion was added 150 mg of polyethylene glycol (average molecular weight: 500,000) and stirred with heating at 120° C. for 1 hr. to obtain an electrolyte solution.

Preparation of Transparent Electrode:

An ITO film having a 15 mm×15 mm current-carrying part was formed on a 1.5 mm thick 2 cm×4 cm glass substrate according to conventional methods to obtain a transparent electrode (electrode 1).

Preparation of Metal Electrode:

Onto a 1.5 mm thick 2 cm×4 cm glass substrate was screen-printed a 15 mm×15 mm current-carrying part using a silver paste ink (DW-250H-5, produced by TOYOBO Co., Ltd.) and was heated at 150° C. for 30 min. in a vacuum oven to obtain a silver electrode (electrode 2).

Preparation of Display Element:

To the electrolyte solution was added spherical polyacryl beads having an average particle size of 20 μm so as to have a volume fraction of 10% and stirred to obtain a solution. The solution was coated on the electrode 2, and further thereon, the electrode 1 was superposed and compressed thereto at a pressure of 9.8 kPa. Then, the circumference was sealed using an olefinic sealing agent to obtain Display Element 1.

Preparation of Display Elements 2-14

Display Elements 2-14 were each prepared similarly to Display Element 1, except that the kind of silver salts, the kind and concentration of additives and the kind of solvents were varied, as shown in Table 1. The respective solvent contents were each the same as the dimethylsulfoxide of Display Element 1.

Details of compounds added to the respective electrolyte solutions, shown as abbreviations in Table 1 are as follows:

TsAg: silver p-toluenesulfonate
*1: 2-mercaptobenzimidazole
*2: mercaptotriazole
*3: 3,6-dithia-1,8-octanediol
*4: cationic silver salt of exemplified compound 30
EC: ethylene carbonate
PC: propylene carbonate
DMSO: dimethylsulfoxide
DMF: dimethylformamide Evaluation of Display Element Driving Method The respective electrodes were each connected to an ac power source. Silver in the electrolyte underwent dissolution-deposition reactions at an electric quantity of 5 mC/cm$^2$, whereby a white display (a silver dissolution state) and a black display (a silver deposition state) were switched.

Measurement of Half-Value Time

The time (half-value time) of the reflectance at 550 nm in the white state becoming ½ was determined as the response speed. A shorter half-value time indicates a faster response speed.

The thus obtained results are shown in Table 1.

TABLE 1

| | Constitution of Electrolyte Solution | | | | | | | | | | |
|---|---|---|---|---|---|---|---|---|---|---|---|
| | Silver Salt | | Additive 1 | | Additive 2 | | Additive 3 | | | Evaluation | |
| Display Element No. | Compound | Concentration (mol/kg) | Compound | Concentration (mol/kg) | Compound | Concentration (mol/kg) | Compound | mass %* | Solvent | Half-value Time (sec) | Remark |
| 1 | AgI | 0.10 | NaI | 0.20 | — | — | — | — | DMSO | 0.60 | Comp. |
| 2 | AgI | 0.10 | NaI | 0.20 | *1 | 0.10 | — | — | DMSO | 0.58 | Comp. |
| 3 | AgI | 0.10 | LiI | 0.20 | — | — | 32-4 | 30.0 | DMF | 0.44 | Inv. |
| 4 | AgI | 0.10 | LiI | 0.20 | — | — | 17-3 | 30.0 | DMSO | 0.45 | Inv. |
| 5 | AgI | 0.10 | LiBr | 0.20 | — | — | 26-3 | 30.0 | DMSO | 0.42 | Inv. |

TABLE 1-continued

| | Constitution of Electrolyte Solution | | | | | | | | | | |
|---|---|---|---|---|---|---|---|---|---|---|---|
| | Silver Salt | | Additive 1 | | Additive 2 | | Additive 3 | | | Evaluation | |
| Display Element No. | Compound | Concentration (mol/kg) | Compound | Concentration (mol/kg) | Compound | Concentration (mol/kg) | Compound | mass %* | Solvent | Half-value Time (sec) | Remark |
| 6 | AgI | 0.10 | LiBr | 0.20 | — | — | 31-4 | 30.0 | DMSO | 0.39 | Inv. |
| 7 | AgI | 0.10 | NaI | 0.20 | — | — | 31-4 | 15.0 | DMSO/PC = 1/1 | 0.30 | Inv. |
| 8 | TsAg | 0.10 | *2 | 0.20 | — | — | 31-4 | 30.0 | PC/EC = 1/1 | 0.32 | Inv. |
| 9 | TsAg | 0.10 | *2 | 0.20 | — | — | 31-4 | 0.5 | PC/EC = 1/1 | 0.43 | Inv. |
| 10 | TsAg | 0.10 | *3 | 0.20 | — | — | 31-4 | 10.0 | PC/EC = 1/1 | 0.25 | Inv. |
| 11 | *4 | 0.10 | *3 | 0.20 | LiCl | 0.02 | — | — | DMSO/EC = 1/1 | 0.40 | Inv. |
| 12 | *4 | 0.10 | *3 | 0.20 | — | — | — | — | PC/EC = 1/1 | 0.37 | Inv. |
| 13 | TsAg | 0.10 | *3 | 0.20 | — | — | 30-3 | 10.0 | PC/EC = 3/7 | 0.26 | Inv. |
| 14 | *4 | 0.10 | *3 | 0.20 | — | — | 30-6 | 10.0 | PC/EC = 7/3 | 0.22 | Inv. |

*mass %, based on solvent

As is apparent from the results shown in Table 1, it was proved that display elements according to the invention, which were each composed of an electrolyte layer containing a compound of formula (1), (2) or (3), exhibited a reduced half-value time and superior responsibility, compared to comparative examples. It was further proved that in the display elements of the invention, the use of a pyridinium compound of formula (1) or satisfying the requirement defined in equation (1) resulted in further enhanced effects described above.

It was further proved that the display elements of the invention, having an electrolyte layer containing a silver salt melt which was prepared by dissolving in a solvent a cationic silver salt of a compound represented by the foregoing formula (1), (2) or (3), exhibited a reduced half-value time and superior responsibility.

Example 2

In each of the display elements prepared in Example 1, application of 1.5 V in an amount equivalent to 5 mC/cm² was replaced by application of 2.0 V for 5 msec, followed by application of 0.8 V for a period until reached a reflectance of approximately 10%.

Subsequently, the total application time was measured similarly to Example 1. As a result, it was confirmed that the total application time of Display Element 1 was approximately the same as the characteristics described in Example 1 but each of the display elements of the invention resulted in 3% enhancement of the effects of the invention.

What is claimed is:

1. A display element comprising opposed electrodes having therebetween an electrolyte layer containing silver or a compound containing silver in a chemical structure, wherein the opposed electrodes are driven so that silver is dissolved and deposited and the electrolyte layer further contains at least one compound selected from the group consisting of compounds represented by formula (2) or (3):

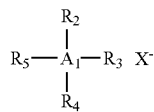

formula (2)

wherein $A_1$ is a phosphorus atom, $R_2$ to $R_5$ are each independently a substituted or unsubstituted alkyl group or a substituted or unsubstituted alkenyl group, and $X^-$ is an anion;

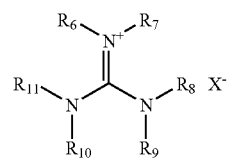

formula (3)

wherein $R_6$ to $R_{11}$ are each independently a substituted or unsubstituted alkyl group or a substituted or unsubstituted alkenyl group, and $X^-$ is an anion.

2. The display element as claimed in claim 1, wherein the electrolyte layer contains a pyridinium compound represented by formula (1) in an amount of 1 to 20% by mass, based on the electrolyte solvent contained in the electrolyte layer.

3. A display element comprising opposed electrodes having therebetween an electrolyte layer containing silver or a compound containing silver in a chemical structure, wherein the opposed electrodes are driven so that silver is dissolved and deposited and the electrolyte layer further contains a silver salt melt prepared by dissolving in a solvent a silver salt of a cation of a compound represented by formula (1), (2) or (3) as claimed in claim 1.

4. The display element as claimed in claim 3, wherein the element satisfies the following requirement as defined in equation (1):

$$0 \leq [X]/[Ag] \leq 0.01, \quad \text{equation (1)}$$

wherein [X] is a molar concentration of halogen ions or halogen atoms contained in the electrolyte layer and [Ag] is a total molar concentration of the silver contained in the electrolyte layer or silver contained in the compound containing silver in a chemical structure.

5. The display element as claimed in claim 3, wherein the electrodes are driven by applying thereto a voltage more than a deposition overpotential to deposit black silver, followed by application of a voltage not more than the deposition voltage to continue deposition of black silver.

6. The display element as claimed in claim 1, wherein the element satisfies the following requirement as defined in equation (1):

$$0 \leq [X]/[Ag] \leq 0.01 \quad \text{equation (1)}$$

wherein [X] is a molar concentration (mole/kg) of halogen ions or halogen atoms contained in the electrolyte layer and [Ag] is a total molar concentration of silver contained in the electrolyte layer or silver contained in the compound containing silver in a chemical structure.

7. The display element as claimed in claim 1, wherein the electrodes are driven by applying thereto a voltage more than a deposition overpotential to deposit black silver, followed by application of a voltage not more than the deposition voltage to continue deposition of black silver.

* * * * *